(12) United States Patent
Conley et al.

(10) Patent No.: US 6,915,309 B1
(45) Date of Patent: Jul. 5, 2005

(54) AUTOMATICALLY GENERATING REPLICATION TOPOLOGY INFORMATION FOR USE BY A DIRECTORY SERVICE

(75) Inventors: Alan Brett Conley, Suisun, CA (US); Robert Curtis Allen, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

(21) Appl. No.: 09/886,851

(22) Filed: Jun. 20, 2001

Related U.S. Application Data

(60) Provisional application No. 60/277,579, filed on Mar. 20, 2001.

(51) Int. Cl.[7] .............................................. G06F 7/00
(52) U.S. Cl. .................................... 707/104.1; 709/238
(58) Field of Search ........................ 707/104.1, 1, 203; 709/238, 218, 219, 203; 370/398, 255

(56) References Cited

U.S. PATENT DOCUMENTS

| | | | | |
|---|---|---|---|---|
| 4,853,843 A | * | 8/1989 | Ecklund ...................... | 707/203 |
| 5,276,789 A | | 1/1994 | Besaw et al. ................ | 395/140 |
| 5,452,415 A | | 9/1995 | Hotka ......................... | 395/161 |
| 5,471,399 A | | 11/1995 | Tanaka et al. ............... | 364/491 |
| 5,483,631 A | | 1/1996 | Nagai et al. ................. | 395/155 |
| 5,515,487 A | | 5/1996 | Beaudet et al. ............. | 395/140 |
| 5,559,955 A | | 9/1996 | Dev et al. ............... | 395/182.02 |
| 5,751,962 A | | 5/1998 | Fanshier et al. ........ | 395/200.53 |
| 5,751,965 A | | 5/1998 | Mayo et al. ........... | 395/200.54 |
| 5,850,526 A | * | 12/1998 | Chou .......................... | 709/247 |
| 5,872,786 A | * | 2/1999 | Shobatake .................. | 370/398 |
| 5,968,121 A | * | 10/1999 | Logan et al. ............... | 709/219 |
| 6,009,081 A | * | 12/1999 | Wheeler et al. ............ | 370/255 |
| 6,040,834 A | | 3/2000 | Jain et al. ................... | 345/356 |
| 6,225,999 B1 | | 5/2001 | Jain et al. ................... | 345/356 |
| 6,442,602 B1 | * | 8/2002 | Choudhry ................... | 709/218 |
| 2002/0065941 A1 | * | 5/2002 | Kaan et al. ................. | 709/249 |

OTHER PUBLICATIONS

David Chappell, "Understanding Microsoft Windows 2000 Distributed Services," Microsoft Press, U.S.A., 2000, pp. 1–9 & 33–81.

* cited by examiner

*Primary Examiner*—Safet Metjahic
*Assistant Examiner*—Etienne P LeRoux
(74) *Attorney, Agent, or Firm*—Hickman Palermo Truong & Becker LLP

(57) ABSTRACT

A method for automatically generating a network topology for a directory service is provided, wherein the topology represents network sites and site links in a distributed computing environment. An implementation of the technique generates a replication topology used for populating the directory service. The topology is generated based on router interface information obtained from router configuration files. A site reference is generated by identifying a sub-network on a Local Area Network interface, and a site link reference is generated by identifying a Wide Area Network interface.

7 Claims, 9 Drawing Sheets

AUTOMATICALLY GENERATING REPLICATION TOPOLOGY INFORMATION FOR USE BY A DIRECTORY SERVICE

CROSS REFERENCE TO RELATED APPLICATIONS

This application claims the benefit of related U.S. Provisional Application No. 60/277,579, filed Mar. 20, 2001 entitled "Method and Apparatus for Automatically Generating Replication Topology Information for Use by a Directory Service," which is incorporated by reference herein.

FIELD OF THE INVENTION

The present invention generally relates to computer networks, and more specifically to automatically generating topology information for use by a directory service that is used in a computer network.

BACKGROUND OF THE INVENTION

An efficient distributed computing environment benefits from having a place to store information about people, machines, and applications that are in the environment or that use the environment. When a user logs in to a computer, for example, the computer needs to find information about the user's account, such as the password. When the user attempts to access an application in a network, the user's machine needs to locate the server on which the application executes. While these issues can be resolved separately, a single solution is preferable.

Directory services have been developed to address these issues. A directory service typically has two main components: a database that contains the information in the directory, and protocols that are used to access that information. One example of a directory service is the Domain Name System (DNS), which primarily functions to map names to machine addresses. DNS can perform machine address lookups rapidly and efficiently. However, DNS is less effective at generalized searches relating to machines, applications or users in the network. The Lightweight Directory Access Protocol (LDAP), and the ITU X.500 directory standard from which LDAP was derived, offer more comprehensive directory services. LDAP, unlike DNS, is explicitly designed for directories that store and access complex data, i.e., data much more complex than names and machine addresses. Most contemporary directory services are based on LDAP, which is controlled by the Internet Engineering Task Force and defined in Request For Comments (RFC) 1777 (for LDAP version 2) and RFC 2251 (for LDAP version 3).

In the Microsoft® Windows® 2000 computing environment, a service called Active Directory is intended to provide a single solution to the foregoing problems and to augment the benefits of the DNS with an LDAP-based directory. Active Directory is an LDAP-compatible directory service that is intended to provide a standard way for every application to store and retrieve information in a distributed Windows 2000 environment. Detailed information about Active Directory is provided in D. Chappell, "Understanding Microsoft® Windows® 2000 Distributed Services" (Redmond, Wash.: Microsoft Press, 2000).

The term Active Directory Server refers to a specific installed instance of one or more software elements that implement the Active Directory service. In a Windows 2000 environment, a domain is a set of network resources (e.g., applications, printers, and the like), and is configured to facilitate management of access to the set of resources. Furthermore, for fault tolerance and redundancy purposes, each domain is typically controlled by multiple domain controllers (DC). Each domain controller stores and uses a complete copy of the Active Directory database for its associated domain.

One drawback associated with comprehensive directory services such as Active Directory is that numerous distributed applications and their users become dependent upon the directory service, thus making the service indispensable. If a machine that is hosting the directory becomes unavailable, users and applications within the distributed environment cannot accomplish their required tasks. Therefore, Active Directory allows replication, which refers to storing and synchronizing copies of the directory database on multiple domain controllers within a single domain. Replicating directory data increases availability of that data in case of system or network failures, and can improve performance by spreading client requests across more than one directory server.

Since each domain typically has two or more domain controllers, each domain controller has a complete copy of the Active Directory database for that domain. Further, Active Directory uses multi-master replication. A client can make changes to any copy of the Active Directory database on any domain controller, and the changes automatically propagate to the directory databases maintained by all other domain controllers in that domain.

In order for Active Directory to operate effectively, the replication process requires management. Active Directory uses information about "sites" and "site links" for describing the replication topology. Sites are collections of sub-networks, or subnets, with fast, reliable connectivity, which typically means high-speed LAN connections. Thus, for example, a site may comprise a plurality of Ethernets that are at the same general physical location. In addition, multiple subnets can be represented by a single high-level network prefix or "address block". Site links are connections between sites, and typically have an associated cost.

Sites are used in the user logon process, whereby the operating system will attempt to locate a domain controller in the same site as the client. Additionally, sites are used to plan Active Directory replication, whereby they may be used to control the rate and/or frequency of replication. Use of sites also allows clients to find the closest domain controller, global catalog server (GC), distribute file system (DFS) share point or application distribution point (via Short Message Service [SMS]).

The network topology created by generating site and site link references is known as the Active Directory replication topology and is stored in the directory. Active Directory includes a tool for managing sites and site links, in the form of a software "snap-in" to Microsoft Management Console ("MMC") called "Active Directory Sites and Services." This software tool may be used to add, change, or delete sites and site links in the Active Directory replication topology. However, the current approach to generating a replication topology is manual, and therefore impractical for use in a large enterprise network.

Consider a large enterprise network that includes several thousand routers and other network devices, and that frequently carries out IP address renumbering. Initially adopting Active Directory for use in such a network would require an administrator to use the MMC snap-in to manually enter information defining all the sites and site links in the replication topology, based on information about the subnets in which all routers in the network participate. Further, when IP addresses for devices in the network are renumbered, or subnet configurations change, other potentially extensive manual change operations are required. These administrative processes are labor intensive and error prone, and accuracy is highly dependent upon having accurate baseline data available.

Based on the foregoing, it is clearly desirable to provide a technique that overcomes the manual approach to generating and maintaining a replication topology for use in a directory service in a distributed computing environment.

SUMMARY OF THE INVENTION

The foregoing needs, and other needs that will become apparent from the following description; are satisfied by the present invention; which comprises, in one aspect, a method for automatically generating a network replication topology for a directory service, wherein the topology represents network sites and site links in a distributed computing environment. The replication topology may be used for populating the directory service, which in turn may populate a plurality of domain controllers in one or more domains. The applicable directory service may be any directory service.

The topology is generated based on router interface information obtained from router configuration files, whereby in certain embodiments, a site reference is generated by identifying a sub-network on a Local Area Network interface, and a site link reference is generated by identifying a Wide Area Network interface. In other embodiments, a site reference is generated by identifying a router interface with a bandwidth exceeding a threshold value, and a site link reference is generated by identifying a router interface with a bandwidth not exceeding a threshold value. In another embodiment, a site link reference is generated by identifying a router interface with a packet round-trip-time exceeding a threshold value.

In one embodiment, preprocessing information may be utilized to nullify the router interface information obtained from the router configuration files. In various embodiments, the router configuration file may be obtained from a network management system, a database, or a network query result. In addition, the process may be programmed to execute automatically and periodically. Furthermore, aspects of the invention are implemented in a computer system, an apparatus, and a computer readable medium.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
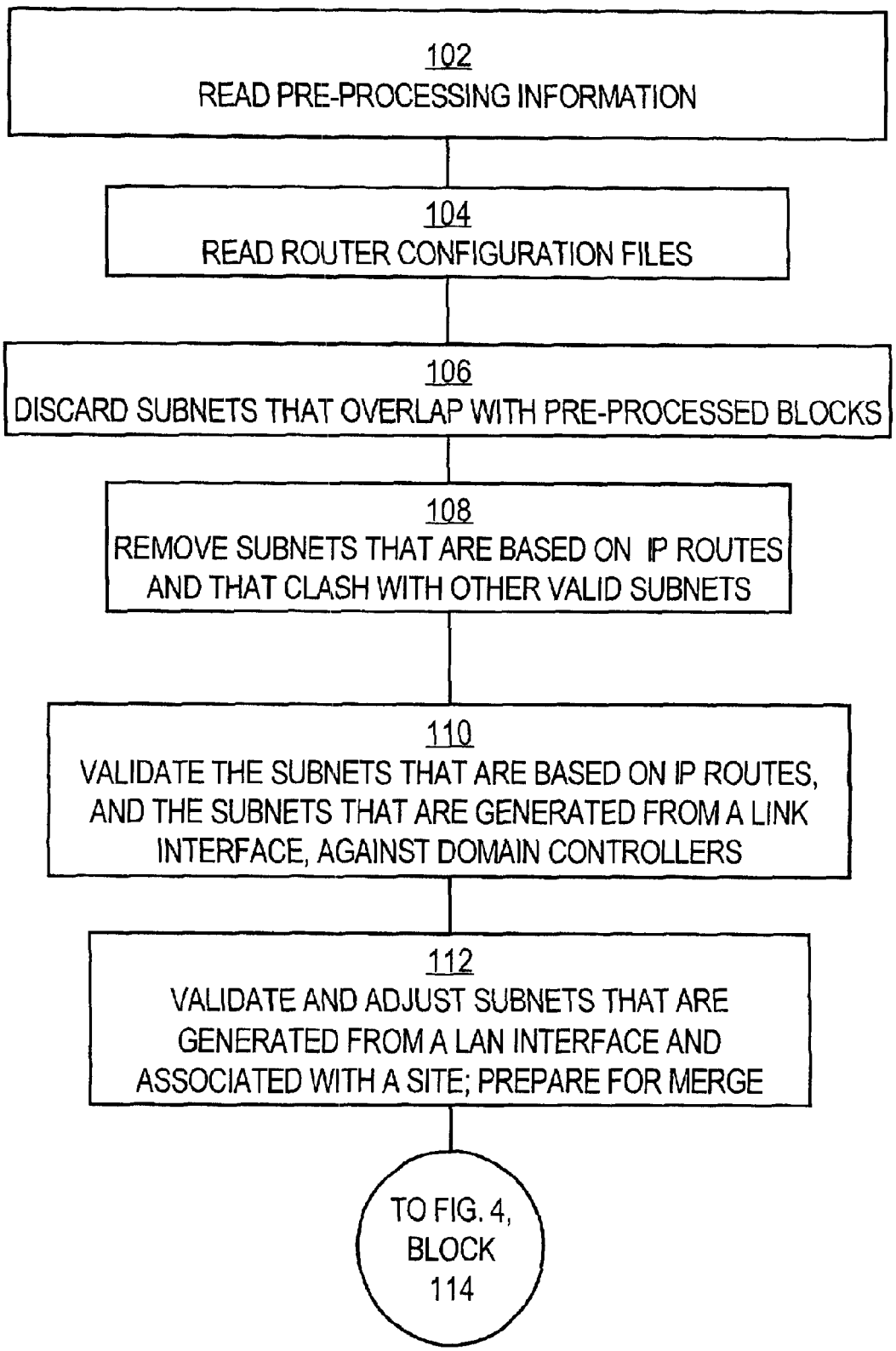
FIG. 1 is a block diagram of a process for automatically generating a network topology for use in a directory service.

A method for automatically generating network topology information is described. Aspects of the method are used to generate the topology for directory service replication purposes. The approaches described herein are applicable to all directory services.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In view of the shortcomings described above in relation to deploying and administering a directory service and its related replication topology, automating the creation and maintenance of a network topology is highly desirable.

The present invention comprises, in one aspect, a method for automatically generating a replication topology for a directory service. Other aspects and features of the invention will become apparent from the following detailed description. For example, in other aspects, the invention encompasses a computer system, an apparatus, and a computer readable medium configured to carry out the steps described herein.

1.0 General Overview

According to one aspect of the invention, site information and site link information are automatically generated based on network topology processing techniques. In one specific aspect, network topology information is created based at least in part on information that is derived from configuration files of routers or other network devices that participate in the network.

Automating the accurate generation of site and site link information based on router configuration files, as described herein, may offer one or more of the following features and benefits:

a topology information generation process can execute multiple times per day;

the topology generation process can override or ignore one or more elements of topology information that are derived from the router configuration files;

the topology generation process can determine which subnets constitute a site;

the topology generation process can determine which connections of subnets or networks constitute site links;

the topology generation process can automatically populate a directory service with topology information;

cost values can be generated for each site link;

subnets within a site can be aggregated under a larger abstraction, e.g., an address block;

a standard list of site names can be maintained;

sites generated by the process can be associated with standard site names maintained by an enterprise (e.g., the "official" names maintained by the enterprise network management department or IT department);

"managed router" services, where router configuration files are unavailable, can be processed;

automatically populating a directory service with the topology can be completed; and exception handling can be implemented whereby the topology generation process generates various exceptions based on information encountered in the configuration files and based on other conditions.

Embodiments are at times described herein with reference to Microsoft Active Directory as one exemplary context in which the processes described herein can be implemented. However, the invention is not limited to use with Microsoft Active Directory. The processes described herein are specifically applicable to any directory service or directory server that maintains a representation of a topology of a network for purposes of directory information replication or other purposes.

2.0 Functional Overview

In an enterprise network, an administrator typically maintains a list of directory site names in a network management database. The administrator ensures that the names of all domain controllers are resolvable using DNS. As the network is deployed, information describing new network servers is added to the network management database by the administrator, including the appropriate directory site name.

An implementation of the techniques described herein may periodically execute a replication topology information generator (hereinafter, topology generator) that embodies these techniques. For example, the topology generator might be programmed to execute once every twenty-four hours.

In one embodiment, the topology generator reads in preprocessing information, preferably from the network management system database, that may be used to override topology information that is generated later by reading router configuration files. According to one approach, the most recent version of router configuration files from the network management database is read. Alternatively, the router configuration files may be discovered through a network query using a conventional protocol, for example, the Simple Network Management Protocol (SNMP). In one embodiment, router configuration files are parsed to obtain the required information. A technique for automatically populating a directory service with the topology is also provided.

Based on various commands and definitions that are found in the router configuration files, information representing sites and site links is generated. According to one embodiment, sites are analogized to Local Area Networks (LAN) for purposes of topology generation. Similarly, site links are considered analogous to Wide Area Networks (WAN) links between LANs. Additionally, site links are recognized as having associated costs, which are similar to the routing metrics for WAN links as used in routing algorithms. Site link costs are used in replication topologies to reflect the speed and reliability of the site links for replication route determination purposes. In one embodiment, known bandwidth on WAN links is used to generate appropriate replication site link costs. Execution of the process generates a replication topology suitable for use in a directory service, including the Configuration, Schema and Domain naming contexts ("NCs") of Active Directory.

According to certain embodiments, a variety of exception conditions are checked and exception reports are generated for review. Under some conditions, the process may abort in which case the replication topology is not updated at the domain controllers. In some embodiments, if the topology generator process completes successfully, the resulting topology information is preferably inserted into a specified domain controller. In order to prevent partial topology information from being replicated, the replication process on the domain controller preferably suspends the topology update.

2.1 Preprocessing

In one embodiment, preprocessing information is read, preferably from the network management system database, which may be used to override topology information that is generated later by reading router configuration files. As non-limiting examples, the preprocessing information can identify one or more subnets to ignore in generating the topology, can identify address blocks and their associated site names, can identify site links and their associated costs, and can identify domain controllers with their associated network management system site names. In one specific embodiment, a graphical user interface is provided that allows an administrator to create and manage the preprocessing information.

Continuing with the preceding embodiment, the topology generator reads the preprocessed information and when the topology generator identifies related information in a router configuration file, the topology generator ignores the entries. In one related approach, sites and site links that are created based upon the preprocessing information are flagged such that they are identified as manually created without reference to configuration file data.

Following is an example of a preprocessing file enabling manual creation of sites and site links:

SITES
Format: Block|AD Site
10.0.0.0/23 |RTP
10.0.0.x/23|SJ
10.1.0.y/23|IGNORE
SITE LINKS
Format: SiteLink|Metric
SJ-RTP|5000;
  wherein "RTP," "SJ," and "IGNORE" are identified as Active Directory sites associated with Internet Protocol (IP) network address blocks.

2.2 Processing Router Configuration Files

In order to automatically generate site and site link information from router configuration files, a technique is provided to determine what network elements constitute sites and site links. In one specific approach, router interface definitions in router configuration files are used for this purpose.

In general, site references are determined by identifying, in the router configuration files, what subnets are on LAN interfaces. These subnets are subsequently processed as sites. As non-limiting examples, an interface reference in a router configuration file is considered to be a LAN interface if it is Fast Ethernet, Ethernet, FDDI, VLAN, Gigabit Ethernet, Token Ring, etc. In contrast, site link references are determined by identifying WAN interfaces in the router configuration files. As non-limiting examples, an interface reference in a router configuration file is considered to be a WAN interface if it is ATM; POS; Serial; HSSI; FR-ATM; Tunnel; CBR, etc.

In an alternative approach, an interface is defined as a LAN interface if the then-current bandwidth exceeds a pre-defined threshold value, such that the interface is associated with a site, and interfaces having lower bandwidth are assumed to be WAN interfaces, which are consequently associated with site links. In another alternative, the determination of whether an interface should be associated with a site or site link may be performed based upon a packet latency value associated with the interface, for example, as measured by packet round-trip-time delay.

Some interfaces that are specified in a router configuration file may be ignored without affecting the effectiveness of the approach herein. In one embodiment, interfaces that are ignored include: Loop back; Dialer; Null; Group-Async; Async; BRI; BVI; Multilink; Switch; and Virtual-Template. Further, in certain embodiments, "Administratively Down" interfaces are ignored, as are any interfaces where the "ip address" line is of the format: ip address negotiated. In another embodiment, definitions specifying null-zero routes are ignored.

A secondary subnet comprising one or more addresses is established in certain routers to enable the routers to route more than one range of IP addresses using one set of physical interfaces. Thus, definitions of secondary addresses may appear in configuration files of certain routers. According to one embodiment, secondary addresses are processed, whereby they are parsed to determine the subnets that they reference. Similarly, route summary definitions in router configuration files can be identified and processed to identify associated subnets.

2.2.1 Access Networks (Home ISDN/Frame/DSL and Dial-In)

Typically, a definition or identification of access networks does not appear in router configuration files. In this context, an access network is a service provider network that typically uses ISDN, Frame Relay, DSL, dial-in, and like connections to provide home or small office users with access to the Internet or to other networks. Furthermore, the configuration files for routers in home networks typically are not available to the network management system, but service routers that lead to home networks often have route summaries for home networks. Since home networks typically will not have directory servers, a home network is considered part of the site nearest the home network. One approach to this issue is to include the route summaries of the access networks as subnets in the closest site. Another approach is to maintain and utilize a template with network prefixes that support all home networks that have access to the network being processed.

2.2.2 RFC 1918 Addressing

Network Working Group RFC 1918 describes address allocation for private networks. Such addresses appearing in an enterprise network are identified and processed, and those addresses that have been designated by networking as routable, such as those used for IP phones, are treated like any other portion of the internal routable address space. RFC 1918 addresses that have been designated as non-routable, such as addresses designated for equipment in laboratory space, are ignored by the process using a preprocessing block.

3.0 Automatically Generating Replication Topology 3.1 Definitions

In this description, the following terms have the following general definitions. These definitions are provided as an aid to understanding descriptions of example embodiments that appear herein, but the invention is not limited to such definitions.

"DC" means Domain Controller, Active Directory Server, or some other directory server. In the process described herein, a list of DCs is preferably read from a network management system. When a DC is entered into the network management system, the user associates it with a site-name-eman.

"site" means a collection of subnets in the form of addresses and prefix lengths, i.e., 171.68.0.0/16.

"repl-gen.pl" means the name of one or more computer programs or other software elements that automatically generate a replication topology.

"site-name-eman" means the name taken from the ad_site lookup table of the network management system, which stores official names of all Active Directory or other directory sites.

"site-name-eman-dc" means the name given to a site that is generated from the association of a DC, its IP address, and the network blocks contained in a site.

"site-name-ip-route" means the name given to a site that is generated from a set of "ip route" configuration file statements collected from a single router.

"site-name-remote" means the site-name at the other end of a site-link from a site. It can be either a site-name or a site-name-temp.

"site-name-temp" means the temporary name given to a site when the process described herein creates it. A site retains this name until it can be associated with a site-name-eman.

"site-name-pre-proc" means the name associated with a site which is read in during the pre processing stage.

"site-link" means the connection between two sites, and is typically implemented by some type of serial link. A site-link has a name and a cost (site-link-cost).

"site-link-half" means a site-link connected to a site, but for which the remote site has not been identified.

"site-link-pre-proc" means a site-link connecting two site-names, which has an associated site-link-cost, typically generated during the pre-processing stage.

"site-link-cost" means the cost/metric associated with a site-link based on bandwidth.

"site-block" means an IP address block that results from summarizing as many subnet-lans or subnet-ip-routes in a site as possible.

"subnet-lan" means an IP subnet generated from a router LAN interface and associated with a site.

"subnet-link" means an IP subnet generated from a router LINK interface and associated with a site-link or a site-link-half.

"subnet-ip-route" means an IP subnet generated from an "ip route" statement in a router configuration file.

"subnet-ip-route-large" means a subnet-ip-route larger than /29.

"subnet-ip-route-small" means a subnet-ip-route in the /29–/32 range.

"router-name" means the name of a router taken from a router configuration file name.

"pre-proc-block" means an address block generated during the preprocessing stage. In the preprocessing information, these blocks are typically either associated with a site-name-pre-proc, or are specified to be ignored.

"island" means a collection of sites that are connected by site-links. Islands are important when there are more than one of them in the generated topology.

"abort" means print an exception, send a page and exit the process.

3.2 Method Description

A method for automatically generating a network topology, preferably a replication topology for a directory service, including generating sites, links and link costs, is now described.

In this description, it is premised that any time a block comparison has to be performed, the method will also verify that the block is a valid block. For example, the block 171.68.1.0/23 is not permitted.

Figure 2:
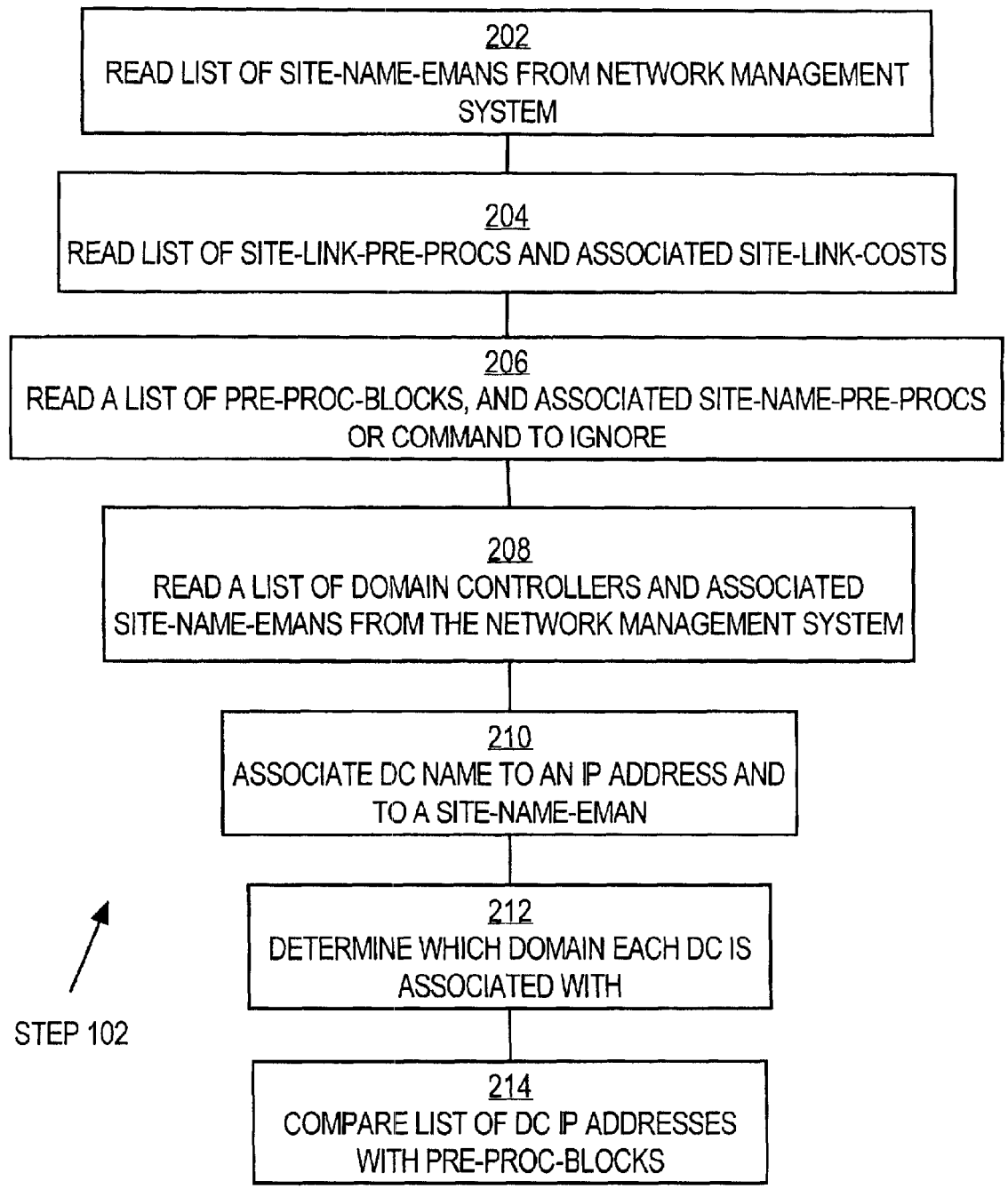
FIG. 2 is a block diagram of a process for reading preprocessing information.
Figure 3:
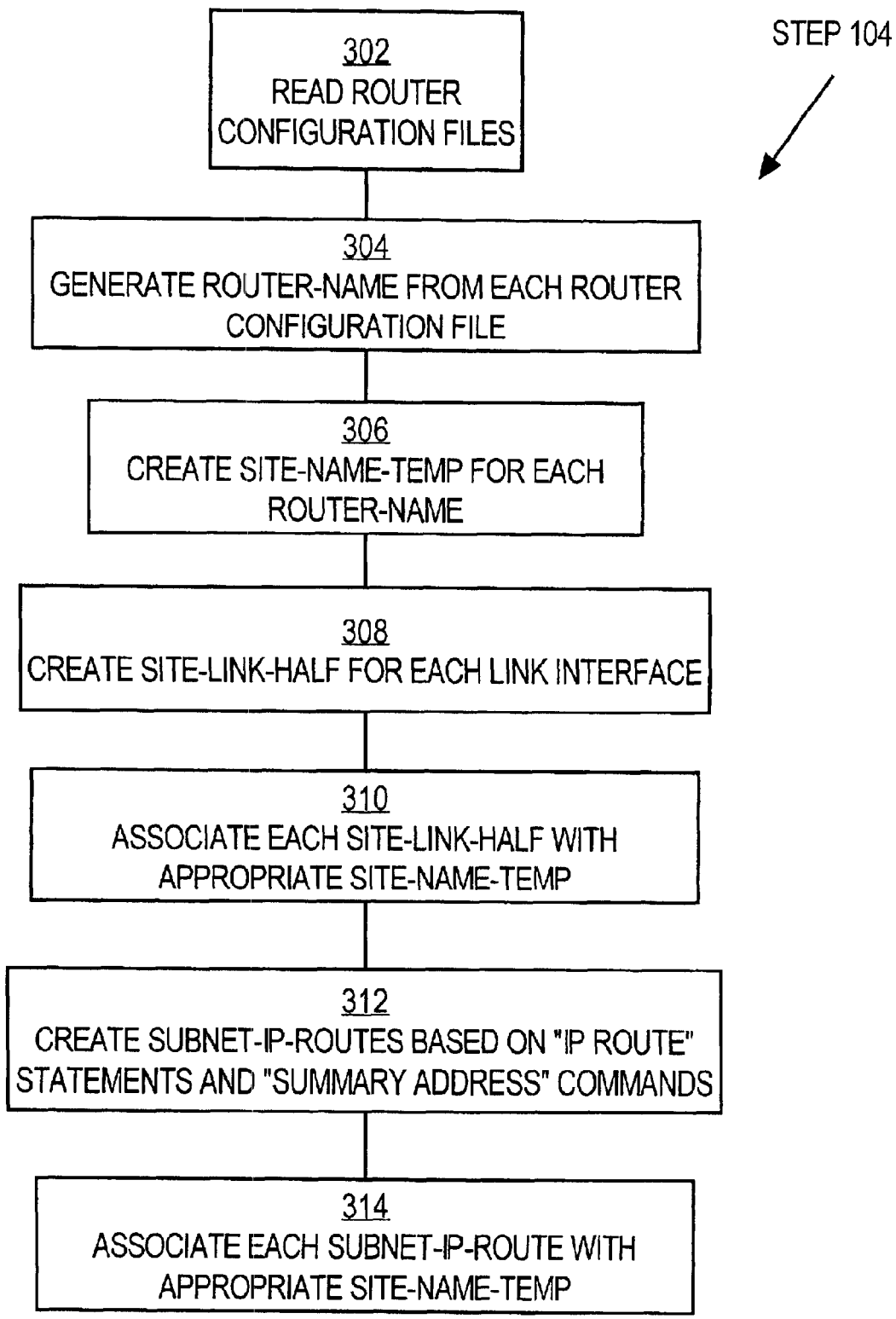
FIG. 3 is a block diagram of a process for reading router configuration files.

FIG. 1 is a block diagram of a process for automatically generating a network topology for use in a directory service. FIG. 1, FIG. 4, FIG. 6, and FIG. 7 illustrate the high-level process flow, and FIG. 2, FIG. 3, and FIG. 5 illustrate detailed sub-steps of the process flow.

In step 102 of FIG. 1, preprocessing information is read. In one embodiment, a process reads in all preprocessing information and performs basic data checking. Step 102 is further illustrated through detailed steps in FIG. 2, which is a block diagram of a process for reading preprocessing information. Step 102 preferably includes step 202, reading a list of site names obtained from a network management system; and step 204, reading a list of preprocessing site links and associated site link costs (i.e., SJ-RTP|5000). Step 204 includes parsing out site names from the site links associated with the preprocessing site links, and comparing them with the site names from the network management system. If there is not a match, an exception is generated and/or printed and the site link is discarded, or deleted from further processing. Step 204 further includes parsing out the site link cost and verifying that it is within a valid range, whereby an exception is generated and/or printed if it is not within a valid range.

At step 206, a list of preprocessing address blocks, and their associated preprocessing site names (i.e., 171.68.10.0/24|AMS) or an indication that they are to be ignored (i.e., 171.68.10.0/24|IGNORE), is read. If the preprocessing site name does not match a site name obtained from the network management system, an exception is generated and/or printed and the preprocessing address block is deleted from further processing. At step 208, a list of DCs from the network management system and their associated site names obtained from the network management systems is read. At step 210, a DC name is associated to an IP address and to a site name obtained from the network management system, preferably utilizing DNS. If a domain name server fails resolution, an exception is generated and/or printed, the DC is deleted from further processing, and processing continues. If more than two servers fail resolution, processing is aborted.

At step 212, it is determined which domain each DC is associated with, preferably utilizing LDAP (e.g., dc.na.cisco.com=>na). If the DC is not associated with any domain, an exception is generated and/or printed. If communication with a DC is unavailable, an exception is generated and/or printed. At step 214, the list of DC IP addresses is compared with the preprocessing address blocks. If a DC IP address is within a preprocessing address block, the process ensures that the preprocessing site name associated with the preprocessing address block and the DC are the same. If they are not the same, then an exception is generated and/or printed and the process is aborted. Furthermore, if a DC IP address is within a preprocessing address block that is designated as "ignored", an exception is generated and/or printed, but the process continues. It is assumed that the "ignore" command overrides the DC IP address and thus, the DC is deleted from further processing.

At this point in the process, there is a list of site names obtained from the network management systems; a list of DC names that map to IP addresses that map to site names obtained from the network management systems and domain names; a list of preprocessing address blocks that map to preprocessing site names; a list of preprocessing address blocks that are to be ignored; and a list of preprocessing site links and associated site link costs.

Returning to FIG. 1, at step 104, generally the router configuration files and a list of routers, preferably from a network management server, or from a query result, are read and error checking is performed on the configuration files. To reiterate, the router configuration files or information therein may come from any source. In one approach, a copy of the configuration file for every router in the network is stored on a network management server. In a related approach, an automated process queries all routers in the network, obtains a copy of their configuration files, and stores them on a designated server. This query may be executed periodically, e.g., once per day during a time of low network demand. In addition, the configuration files are preferably stored in a database.

In another alternative approach, SNMP or similar requests are sent to each router in the network to obtain the information in step 104, thus obtaining then-current router configuration information. This alternative is believed to be practical for smaller networks, although it could be managed for a large network with sufficiently high processing power or sufficient time. In still another alternative, the router configuration file information is obtained from a separate network management system that has a configuration file management function, e.g., CiscoWorks 2000 from Cisco Systems, Inc., of San Jose, Calif. In this alternative, the automatic replication topology generation process can query the separate network management system and obtain the configuration file information.

In accessing the configuration files from the network management database, the "download status", the "Area" and the "last successful download" date is noted. If the database is inaccessible, an exception is generated and/or printed and the process is aborted.

Referring back to step 104, the routers identified in the network management system are compared with a list of routers obtained via their configuration files. Consequently, if a router exists in the network management system but there is no associated configuration file, an exception is generated and/or printed. The exception is generated even if the router is configured as "No Download", which is so flagged in the exception. Step 104 further entails checking the network management system database for a date of "last successful download" for each router configuration. Preferably, if the date is more than three days old, a warning is printed, but the configuration is kept for further processing. Furthermore, if the date is more than seven days old, an exception is generated and/or printed, and the router's configuration is deleted from further processing.

Step 104 of FIG. 1 is further illustrated through detailed steps in FIG. 3, which is a block diagram of a process for reading router configuration files. At step 302, the router configuration files are read. If an unrecognized interface type is encountered, an exception is generated and/or printed. At step 304, a router name from the name of each of the configuration files is generated. At step 306, a temporary site name is created for each router name. Next, all subnets generated from a router LAN interface s found on the router are referenced to the appropriate temporary site name and the router name is associated with the temporary site name.

At step 308, a site link half for each LINK interface is created. A site link half preferably contains a subnet link, an interface and a bandwidth value as attributes. If there is no bandwidth value, it is set to zero. Each site link half is associated with the appropriate temporary site name, at step 310. Then at step 312, "ip route" subnets are created based on "ip route" statements (exclude Null0 and 0.0.0.0 routes) and "summary-address" commands, which are interface subcommands. If the interface is shutdown, the summary-address command is ignored. The "ip route" subnets are placed in two categories, small "ip route" subnets and large "ip route" subnets, based on their sizes. Finally, at step 314, each "ip route" subnet is associated with the appropriate temporary site name of the router. It is noted that this is just an association at this point in the process, and that these subnets are not yet to be merged with the temporary site name subnets generated from a router LAN interface.

At this point in the process, in addition to what was present after performing step 102, there is a list of temporary site names associated with a router name; a list of subnets generated from a router LAN interface s; a list of site link halfs wherein each site link half is associated with a router LINK interface subnet, a router, an interface and a bandwidth value; and a list of "ip route" subnets, both large and small.

Referring to step 106 of FIG. 1, subnets that overlap with pre proc blocks are discarded. In general, step 106 involves comparing all subnets generated from a router LAN interface s, subnets generated from a router LINK interfaces, and "ip route" subnets with the preprocessing address blocks, and consequently removing data that is superseded by the pre processing information of step 102. If a subnet is a subset or superset of a preprocessing address block, an exception is generated and/or printed and the subnet is deleted from further processing. In addition, a specific exception message can be generated and/or printed for both of the conditions and the associated subnet and preprocessing address block specified. Further-more, if a site link half is associated with a router LINK interface subnet that has been deleted, the site link half is deleted as well. If a temporary site name no longer contains any valid subnets generated from a router LAN interface s, it and any associated router names, site link halfs, router LINK interface subnets and "ip route" subnets are deleted from further processing.

At this point in the process, the same results are present as at the end of step 104, with the exception of information that was removed because it was superceded by preprocessing information.

At step 108, the process removes "ip route" subnets that conflict with other valid subnets. In this step, the process compares all "ip route" subnets with all subnets generated from a router LAN interface s and router LINK interface subnets. The goal is to eliminate any "ip route" subnets that point to a subnets generated from a router LAN interface, since the purpose of using "ip route" subnets is to find networks that don't exist as a subnets generated from a router LAN interface in a configuration file. An example of such a network is a home network. Step 108 entails looping through the "ip route" subnets, whereby if a "ip route" subnet is a subset of or superset of a subnets generated from a router LAN interface or router LINK interface subnet, an exception is generated and/or printed and the "ip route" subnet is deleted from processing. At this point in the process, the same results are present as after step 106, with the exception that some of the "ip route" subnets are removed due to overlaps with other subnets.

At step 110, the process validates "ip route" subnets and router LINK interface subnets against DCs. In general, the process will compare IP addresses of DCs with "ip route" subnets and router LINK interface subnets. If a DC IP address is within an "ip route" subnet, an exception is generated and/or printed. This condition could arise from an error in a configuration file, or in the case where a home network contains a domain controller. In response, the process may generate an alarm, since including a home network domain controller in a replication plan could result in significant problems. For example, suppose that two individuals have a DC at home. If their subnets were merged into a single site, the two DCs would think that they were connected via a LAN and try to replicate appropriately. If a DC IP address fits within a router LINK interface subnet, an exception is generated and/or printed and the process is aborted. At this point in the process, the same results are present as after step 108, with the exception that some exceptions may have been generated and/or, or the process may have aborted.

At step 112, the process validates and adjusts subnets generated from a router LAN interface s, and prepares to merge data. In general, the process will compare subnets generated from a router LAN interface s with all other subnets generated from a router LAN interface s, identify incompatible masks, generate exceptions and adjust masks accordingly. This will allow sites to still merge, even though they have incompatible masks. Step 112 entails looping through all of the temporary site names, and for each temporary site name, looping through the subnets generated from a router LAN interface s. If a subnet generated from a router LAN interface is a subset of or superset of another subnets generated from a router LAN interface in another site, an exception is generated and/or printed and the mask of the smaller subnet is changed to match that of the larger one. Note that it is not necessary to compare the subnets generated from a router LAN interface s within a temporary site name. At this point in the process, the same results are present as after step 110, with the exception that some exceptions may have been generated and some subnet masks may have been changed.

Figure 4:
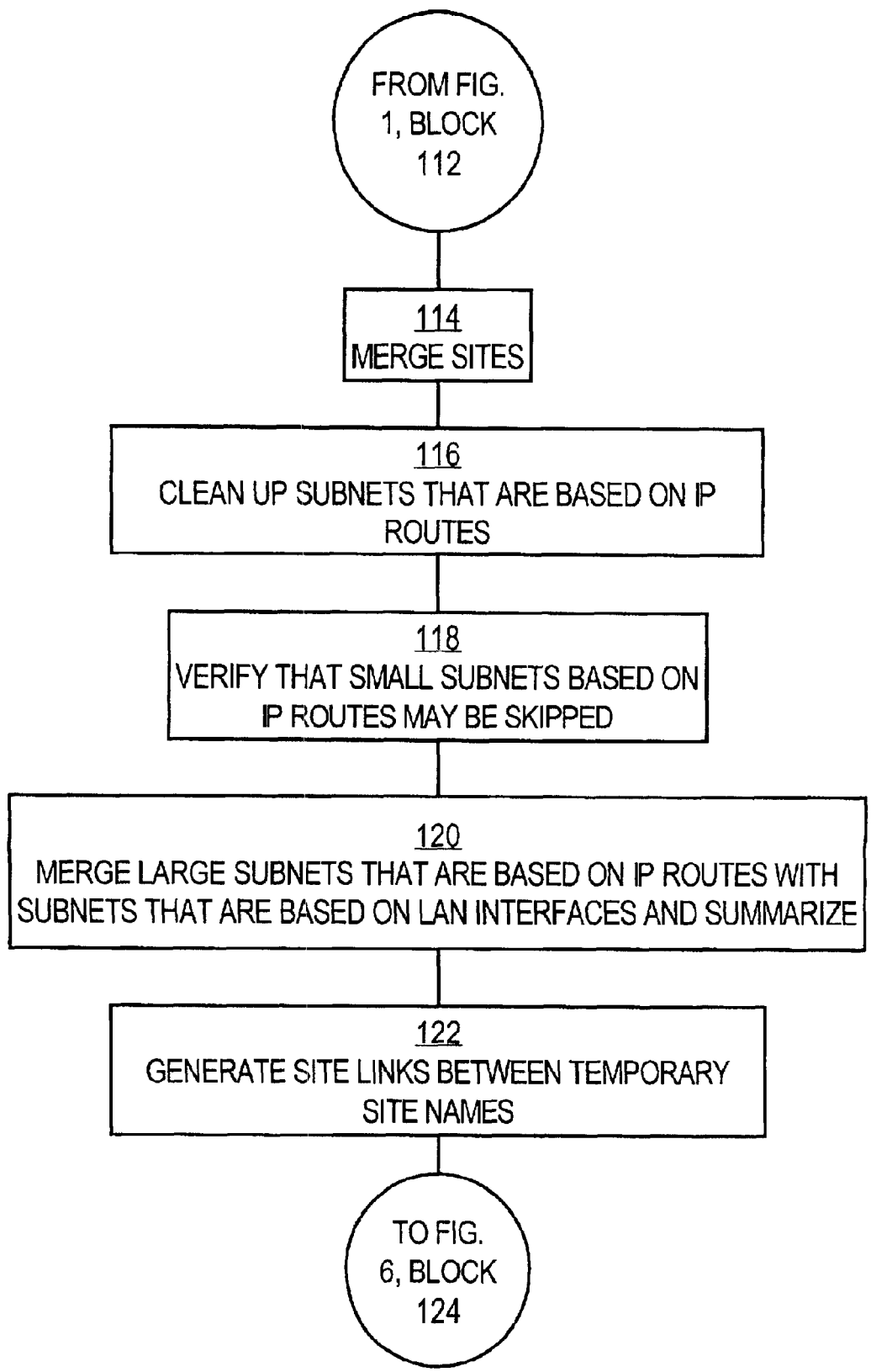
FIG. 4 is block diagram continuing the process of FIG. 1 and thus depicts a process for automatically generating a network topology for use in a directory service.
Figure 5:
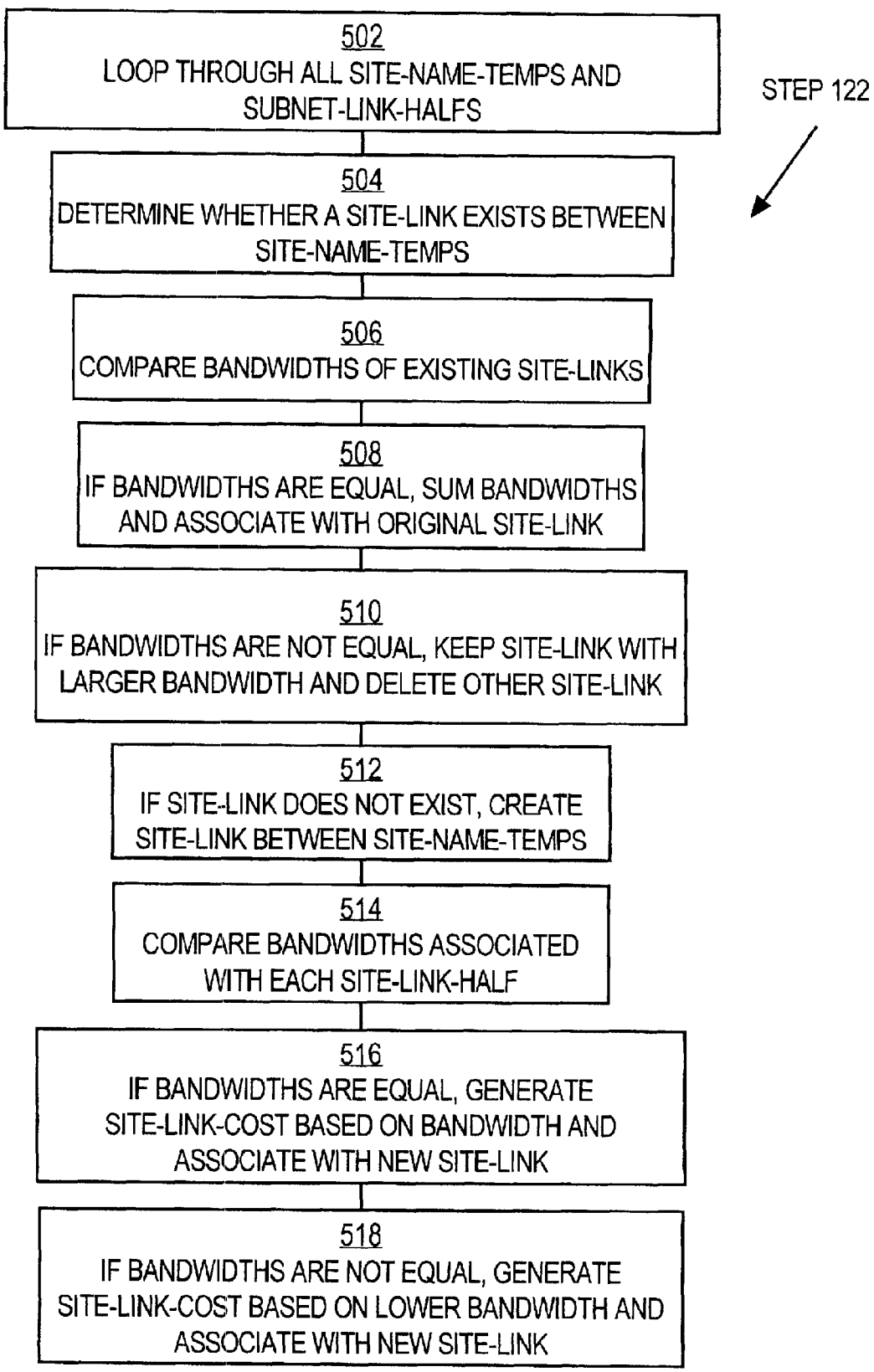
FIG. 5 is a block diagram of a process for generating site links between temporary site names.

Referring now to FIG. 4, as a continuation of FIG. 1, at step 114 sites are merged. Generally, the process combines multiple sites into complete sites for all temporary site names. Additionally, site link halfs (and associated router LINK interface subnets, routers, interfaces and bandwidth values) and "ip route" subnets (large and small) are moved to the newly created sites and a new temporary site name is generated. Step 114 entails looping through all of the temporary site names, and for each temporary site name, looping through the subnets generated from a router LAN interface s. If a subnet generated from a router LAN interface matches a subnet generated from a router LAN interface on any other temporary site name, the two sites are merged into a new temporary site name. Next, all site link halfs associated with the old temporary site names are associated with the new temporary site name. Site links, "ip route" site names, and router names from the old temporary site name are also moved to the new temporary site name, and the old temporary site names are deleted. This process is repeated until sites can no longer be combined. At this point in the process, the same results are present as after step 112, with the exception that there are fewer, but larger, temporary site names.

At step 116 of FIG. 4, the process cleans up "ip route" subnets. Since all of the temporary site names are merged into the largest possible sites, a cleanup of the "ip route" subnets is preferred. This process is performed at this point because the processing will depend on which temporary site name the "ip route" subnets are associated with and thus the temporary site names are merged first. This part of the process is intended to find duplicate or superset "ip route" or "eigrp summary" statements associated with different sites. This is possible from a routing perspective, since an "ip route" could be present on one router and a larger "eigrp summary" present on an upstream router. It is important to ensure that all address blocks in the directory service are unique. Also, only the "ip route" subnet associated with the site to which it is closest is kept.

Part of the process described below ensures that duplicated "ip route" subnets do not exist, which might require manual verification through an exception report. In addition, if "ip route" subnets are duplicated in the same site, then the larger "ip route" subnet is preferably kept, since it will help reduce the number of networks in the directory service topology. In this case, since both "ip route" subnets are in the same site, this will not impact the determination that the "ip route" subnet is associated with the site closest to the remote network. If the "ip route" subnets are in separate sites, the smaller "ip route" subnet is kept, since it is the more specific route and more likely to be in the site closest to the remote network.

Step 116 entails looping through all of the "ip route" subnets, and if an "ip route" subnet matches another "ip route" subnet, it is determined whether they are in the same site. If so, one of them is kept as described above. If they are not in the same site, one of them is also kept as described above. In addition, an exception is generated containing both ip routes, the sites they are in, and which one was kept and which was discarded. Next, step 116 entails again looping through all "ip route" subnets, and if an "ip route" subnet is a superset of another "ip route" subnet, it is determined whether they are in the same site. If so, the larger "ip route" subnet is kept and the smaller one discarded. If they are not in the same site, the smaller "ip route" subnet is kept, the larger is discarded, and an exception generated. The exception preferably includes the site in which the discarded "ip route" subnet formerly resided. At this point in the process, the same results are present as after step 114, with the exception that there are no longer any duplicate or superset "ip route" subnets.

The process is at a point at which all of the "ip route" subnets are merged with the subnets generated from a router LAN interface s for each site, to reduce the total number of sites and possibly the total number of networks in the topology, and thus the directory service. This step produces no significant impact on replication, since there are no DCs in the remote networks that are merged. Furthermore, there is no significant impact on clients at these remote networks, since the networks are being merged with their nearest neighboring temporary site name. Even further, to reduce the total number of networks that are copied into the directory service, an attempt is made to summarize the subnets generated from a router LAN interface s in each temporary site name. If this is completed after merging all of the "ip route" subnets into the subnets generated from a router LAN interface s, the processing requirements are considerable.

Hence, to reduce the processing time, the small "ip route" subnets (/29–/32) are ignored, but these networks are accounted for by including them in one of the larger "ip route" subnets. In order to verify this, one approach is to first generate a report that shows all small "ip route" subnets which are not included in one of the large "ip route" subnets. Step 118 of FIG. 4 entails looping through all of the small "ip route" subnets, and for each one, checking if it is a subset of one of the large "ip route" subnets. If it is not a subset, an exception is generated and/or printed, which includes the temporary site name to which the small "ip route" subnet is associated. Manual review of the exception report is recommended to ensure proper association of the small "ip route" subnets with the large "ip route" subnets. At this point in the process, the same results are present as after step 116, with an additional exception report.

At step 120 of FIG. 4, the process merges all large "ip route" subnets associated with a temporary site name with the subnets generated from a router LAN interface s associated with the same temporary site name. As described in reference to step 118, all small "ip route" subnets (/29–/32) are ignored. At the end of this step, there will no longer be any "ip route" subnets. Step 120 entails looping through the temporary site names and merging all large "ip route" subnets with subnets generated from a router LAN interface s, leaving only a list of subnets generated from a router LAN interface s. Next, the subnets generated from a router LAN interface s are summarized into the largest address blocks possible, thus reducing the number of networks copied into the directory service. At this point in the process, the same results are present as after step 118, except there are no longer any "ip route" subnets and all of the subnets generated from a router LAN interface s have been summarized into the largest address blocks possible.

Step 122 of the process generates site links between temporary site names. Since at this point in the process there is a complete list of temporary site names with each one having a summarized list of subnets generated from a router LAN interface s, and each temporary site name also has a list of site link halfs, the other end of each of these site link halfs is found and appropriate site links suitable for populating a directory service are created. Any remaining site link halfs are considered an exception and thus included in an exception report, and then excluded from any further processing.

Step 122 of FIG. 4, which is further illustrated through detailed steps in FIG. 5, which is a block diagram of a process for generating site links between temporary site names, entails looping through all of the temporary site names, and for each temporary site name, looping through the router LINK interface subnet halfs, at step 502. If a router LINK interface subnet half matches more than one other router LINK interface subnet half on any other temporary site name, an exception is generated and/or printed, and the first match is utilized. If a router LINK interface subnet half matches only one other router LINK interface subnet half on any other temporary site name, this is a valid site link. At step 504, it is determined whether a site link between the two temporary site names already exists. If a site link already exists, the bandwidth of the two site links is compared, at step 506. If the bandwidths are equal, then the bandwidths are summed and the summed bandwidth is associated with the original site link, at step 508. The new site link is deleted and an informational message is printed. Step 508 is performed because two direct links to a neighboring site with the same bandwidth should have the same routing metric, hence causing load balancing across the two links. If the bandwidths are different, at step 510 the site link with the larger bandwidth is kept and the other site link deleted from further processing. An informational message can be generated and/or printed. In such a case, all traffic would normally flow over the link with the larger bandwidth/better metric. It should also be ensured that the same site link is not created twice. For example, for the same WAN link between two sites, one in each direction (i.e. site1::site2 and site2::site1) should not be created.

If a site link does not already exist, a site link between the two temporary site names is created at step 512, which includes the site link half from each temporary site name. Next, at step 514, the bandwidths associated with each site link half are compared. If the bandwidths match, a site link cost based on the bandwidth is generated and associated with the new site link, at step 516. If the bandwidths do not match, at step 518 a site link cost based on the lower of the two bandwidths is generated and associated with the new site link. Furthermore, if one site link half has a bandwidth, but the other does not, use the sole bandwidth for the site link cost. Still further, if there is no bandwidth for either site link half, an exception is generated and/or printed, and a site link cost is created, preferably equal to 2717 (assumes a T1). Next, when the process is finished connecting temporary site names, the process continues by looping through all remaining site link halfs and generates and/or prints an exception indicating a site link half that goes nowhere is present. Such site link halfs are deleted from further processing. The exception report lists the site link half, the associated router LINK interface subnet, and temporary site name. At this point in the process, the same results are present as after step 120, with the exception that most (if not all) temporary site names are connected to other temporary site names via site links with appropriate site link costs, and all site link halfs have been deleted from further processing.

Figure 6:
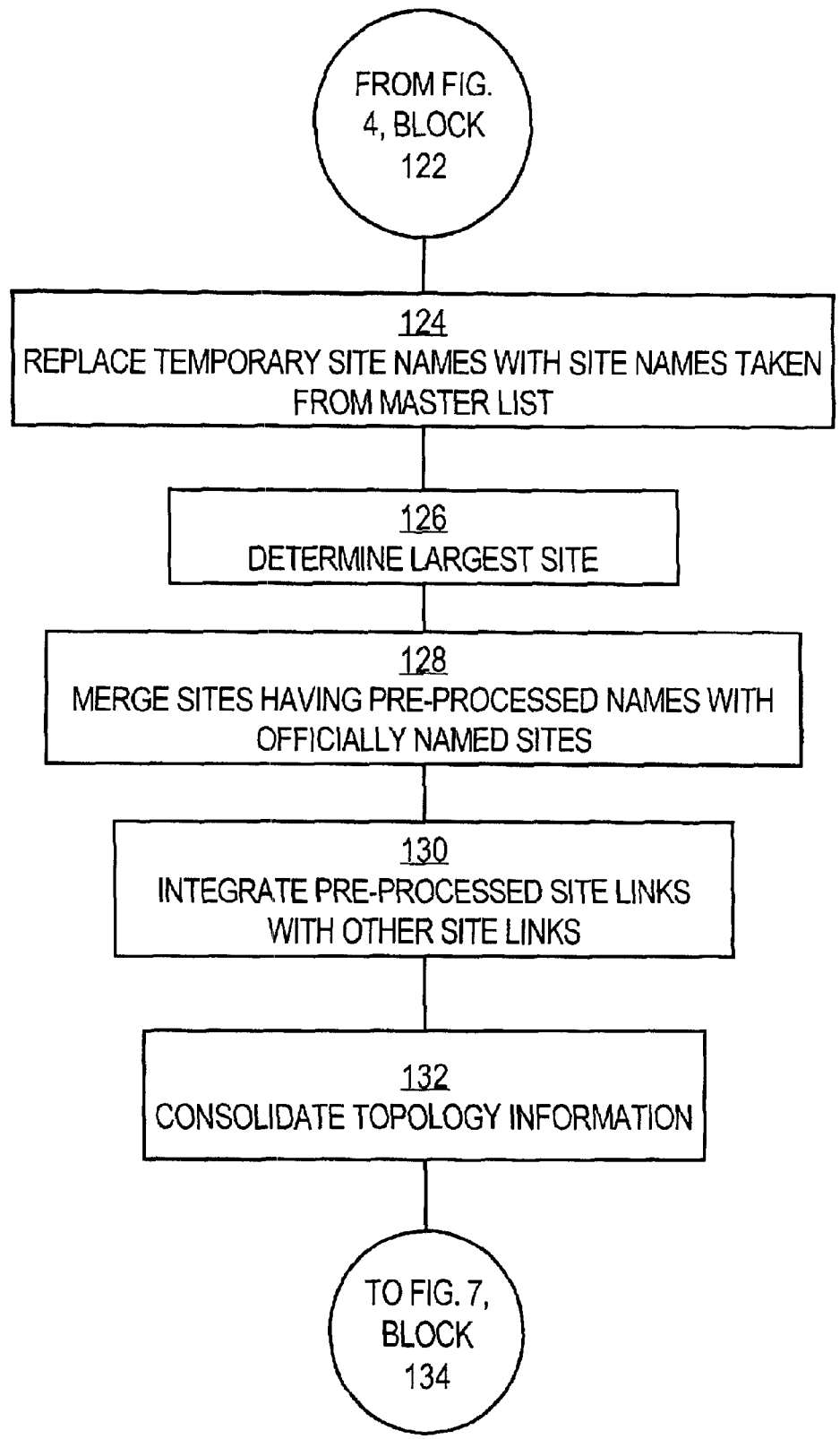
FIG. 6 is a block diagram continuing the process of FIGS. 1 and 4, and thus depicts a process for automatically generating a network topology for use in a directory service.

Referring now to FIG. 6, as a continuation of FIG. 4, at step 124 the process will replace temporary site names with site names generated from an association of a DC and its IP address (DC site name), where possible. The association between the DC IP address and the site name obtained from the network management system is used to formulate standard names for sites. Step 124 entails looping through the DCs and their IP addresses, and for each DC IP address, looping through the temporary site names. Next, for each site block, if the IP address of the DC falls within the site block, the process determines whether a DC site name has already been assigned for this temporary site name. If it has, the two names are compared and if they are different, an exception is generated and/or printed and the process is aborted. If the names are the same, the process proceeds to the next site block.

When the process finishes looping through the site blocks, either there will have been a match for a site name obtained from the network management system or not. If there is a match, the site is renamed from it's temporary site name to the appropriate DC site name, and the appropriate DC and domain are associated with the DC site name. If there is no match, the temporary site name is retained, and it is concluded that this is a site with no DC. At this point in the process, the same results are present as after step 122, with the exception that some of the temporary site names have been renamed with DC site names. In addition, for each DC site name, there is also an association with one or more DCs and one or more domains.

At step 126 of FIG. 6, the process computes the largest site for the primary purpose of creating site links from other islands back to the largest island. Step 126 computes the largest site by computing the total number of addresses in each temporary site name and DC site name. At this point in the process, the same results are present as after step 124, with the exception that the largest site is now known.

At step 128 of FIG. 6, the process merges preprocessing site names with DC site names. The preprocessing site names may have names that are the same as some of the newly created DC site names. It is desirable to take all of the site blocks associated with a preprocessing site name and merge them with the site blocks associated with the DC site name with the same name. It is possible that there will be a preprocessing site name that does not have the same name as a DC site name, which would happen if a DC were not found in the site. Step 128 entails looping through the preprocessing site names, and for each preprocessing site name, looping through the DC site names. If the DC site name and the preprocessing site name match, the preprocessing address blocks associated with the preprocessing site name are merged with the DC site name and the preprocessing site name is deleted. If the preprocessing address block is equal to or a subset of a subnets generated from a router LAN interface, the preprocessing address block is skipped and an informational message is generated and/or printed. If the preprocessing address block is a superset of a subnets generated from a router LAN interface, the subnets generated from a router LAN interface is deleted and an informational message is generated and/or printed. At this point in the process, the same results are present as after step 126, with the exception that some of the preprocessing address blocks have been merged with the appropriate DC site name. Note that it is still possible that some preprocessing address blocks are left unmerged, for example, preprocessing address blocks that are associated with a preprocessing site name that did not map to a DC site name. These are either linked to a DC site name via a preprocessing site link or are considered an island.

At step 130 of FIG. 6, the process integrates preprocessing site links with the site links, either by overriding existing site links based on pre processing information or creating new site links. Step 130 entails looping through the preprocessing site links, and for each preprocessing site link, parsing out the two preprocessing site names. Next, the process loops through the site names obtained from the network management systems. If both preprocessing site names match a site name obtained from the network management system, then the preprocessing site link is a legitimate site link.

Next, it is determined whether a site link already exists for these two sites, checking both "directions". That is, if the preprocessing site link is depicted as site1::site2, searching for both site1::site2 and site2::site1 is performed. If a site link already exists for these two sites, then the existing site link is deleted and the preprocessing site link and it's associated site link costs are kept. In addition, an informational message can be generated and/or printed. If a site link exists for only one of the two sites, it is determined whether the site that does not match is associated with a preprocessing site name, and if it is not, an exception is generated and/or printed and the preprocessing site link is deleted from further processing. If neither of the two sites has an existing site link, both sites are checked to determine whether they are associated with a preprocessing site name. If either one is not, an exception is generated and/or printed and the preprocessing site link is deleted from further processing. At this point in the process, the same results are present as after step 128, with the exception that the processing of the preprocessing data is completed, and thus, subsequently disregarded in further processing steps.

At step 132 of FIG. 6, the process consolidates the topology information. At this point in the process, all special processing with respect to the various types of sites (i.e., DC site names and temporary site names) is completed. Hence, a single list of site names is created consisting of DC site names and temporary site names, with a common set of attributes. The temporary site names will not have values for all of the attributes (i.e., DCs and domains). At this point in the process, there exists a list of site names associated with a list of router names, a list of site blocks, a list of site links to other site names with site link costs, one or more DCs, and one or more domains.

Figure 7:
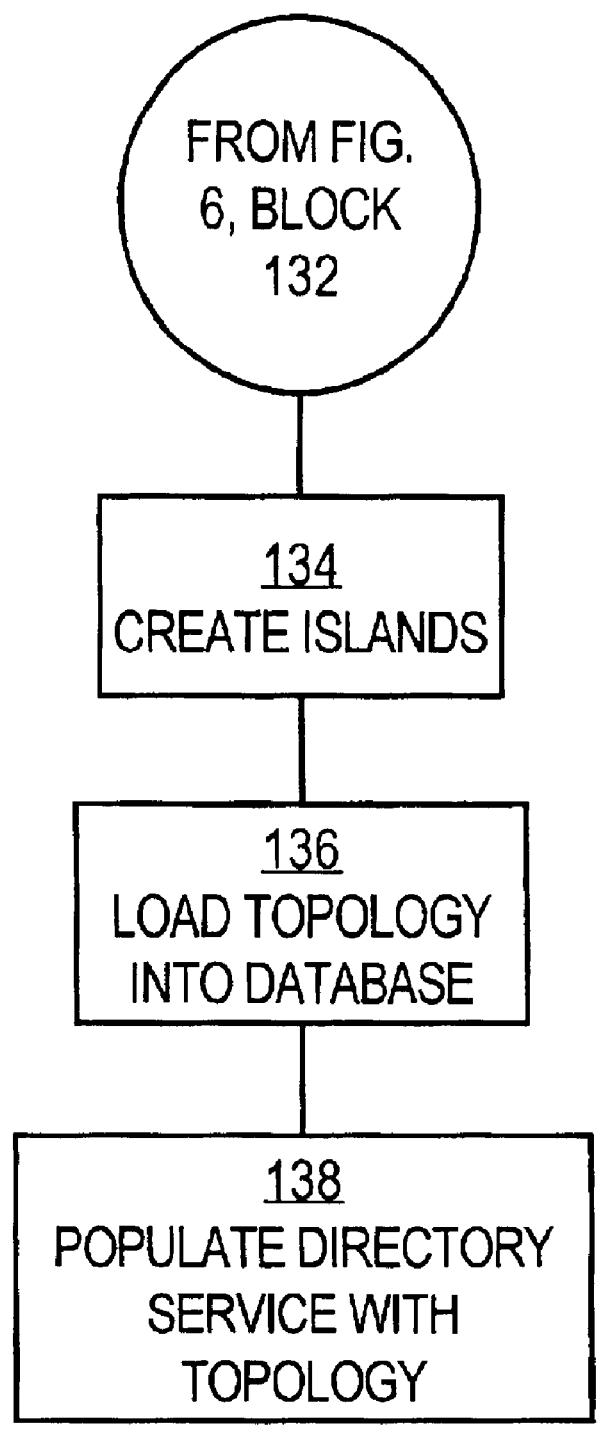
FIG. 7 is a block diagram continuing the process of FIGS. 1, 4, and 6, and thus depicts a process for automatically generating a network topology for use in a directory service.

Referring now to FIG. 7, as a continuation of FIG. 6, at step 134 the process will create islands. In order to support replication for each naming context (e.g., Schema, Configuration, Domain), full connectivity between all sites that contain DCs needs to be ensured. The replication topology for the Schema and Configuration NCs includes all sites. The replication topology for the Domain NCs includes all sites associated with each domain. To ensure that all clients can find the nearest DC, connectivity for all sites, including those without DCs, needs to be ensured.

Although block 102 allows for manual input of topology information to override or augment that which is generated automatically, it is possible, due to a variety of reasons, that the process will end up with several islands of sites. If more than one island is present, the largest island should be determined and used when actually populating the directory service with the replication topology. The remaining islands are to be described in an exception report, or Island Report. The Island Report can be used to augment the preprocessing data used in block 102, or it can be used to determine that configuration files are missing or that information on the routers is mis-configured.

Step 134 entails looping through the list of site names. If the site name is not associated with an island, a new island is created and the site name is put on the island. If the site name has site links, the site links are looped through and it is determined whether the associated remote site is associated with an island. If it is not, then it is put on the same island as the current site. If the remote site is already on an island, it is determined whether it's island is different than that of the current island. If it is different, then all site names that are on the second island are put on the current site name's island. The process keeps looping through all of the site names until all are on islands. Next, the largest island is determined by counting the total number of sites on the island, and this largest island comprises the replication topology that is used to populate the directory service. All remaining islands are included in an exception report.

At step 136 of FIG. 7, the process loads the topology information into the network management database (DB), which will be the source for actually populating the directory service with the replication topology as well as the source for generating various programmed and ad hoc reports.

At step 138 of FIG. 7, the process will populate the directory service with the topology, which comprises adding and deleting sites; adding, deleting, and modifying subnets; adding, deleting, and modifying site links; and adding and modifying servers.

3.3 Additional Stages

According to one embodiment, replication schedules are added to site links based on site link cost. In another embodiment, all subnets generated from a router LAN interface s at the islands are merged into the largest site. In yet another embodiment, all islands are merged into one big site and then a site link is created back to a primary enterprise location. This would at least cause any island site with a DC to use inter-site replication instead of intra-site replication.

3.4 Implementation Mechanisms

Embodiments may be implemented in one or more software elements. In one specific implementation, the foregoing process depicted in FIG. 1–FIG. 7 is implemented using one or more Pert scripts, C language programs, etc.

4.0 Hardware Overview

Figure 8:
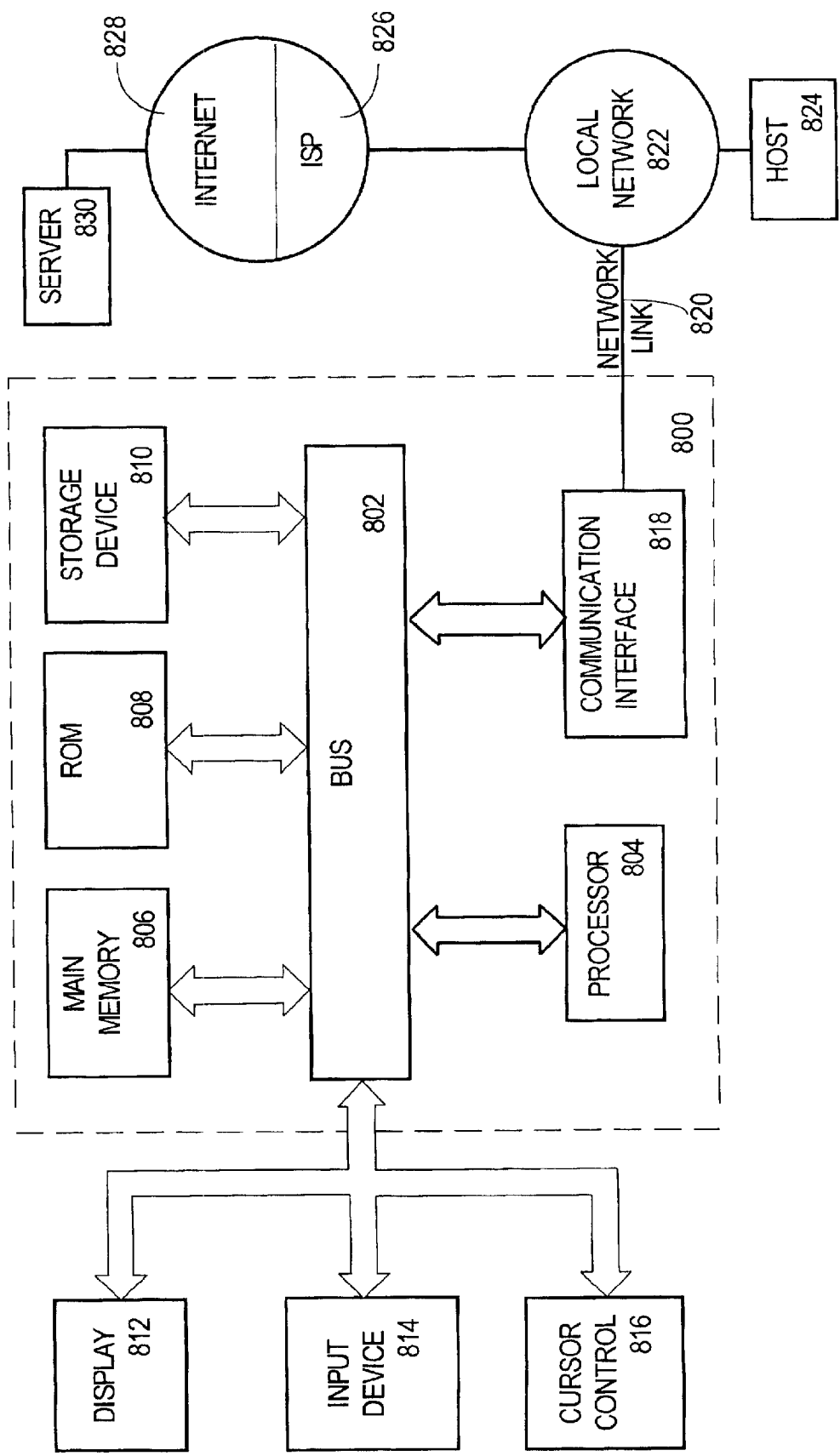
FIG. 8 is a block diagram illustrating a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk, optical disk, or magneto-optical disk, is provided and coupled to bus 802 for storing information and instructions.

Computer system 800 may be coupled via bus 802 to a display 812, such as a cathode ray tube ("CRT") or a liquid crystal display ("LCD"), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for automatically generating a replication topology for a directory service. According to one embodiment of the invention, automatically generating a replication topology for a directory service is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical, magnetic, or magneto-optical disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the worldwide packet data communication network now commonly referred to as the "Internet" 828, Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for automatically generating a replication topology for a directory service as described herein.

Processor 804 may execute the received code as it is received, and/or stored in storage device 810, or other non-volatile storage for later execution. In this manner, computer system 800 may obtain application code in the form of a carrier wave.

Figure 9:
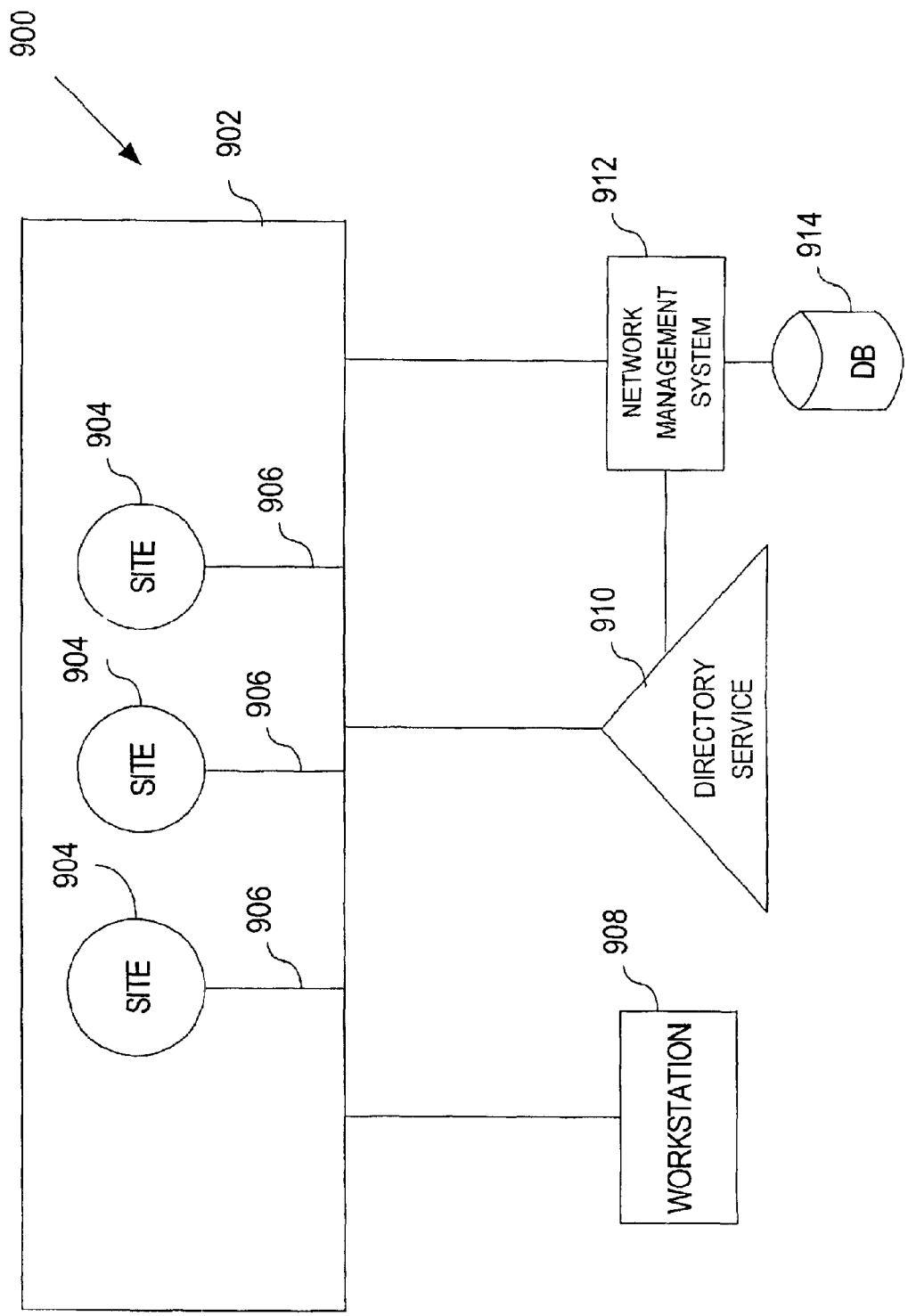
FIG. 9 is a block diagram that illustrates an exemplary operating environment in which an embodiment may be implemented.

FIG. 9 is a block diagram that illustrates an exemplary operating environment 900 in which an embodiment of the invention may be implemented. Operating environment 900 includes a network 902, or distributed computing environment, with a plurality of sites 904 and site links 906. A workstation 908, on which an embodiment of the invention may execute, is connected to the network 902. The workstation 908 is exemplified as the computer system 800 (FIG. 8).

Additionally connected to the network 902 is a directory service 910 for providing a standard method of storing and retrieving, among other information, the network 902 topology information including site 904 and site link 906 information. The directory service 910 may reside on a separate directory server or another server on the network 902. The directory service 910 is additionally connected to a network management system 912, either directly and/or through the network 902. As described above, various steps in the topology generation process include accessing the network management system 910. In particular, the preprocessing information referenced in step 102 of FIG. 1 and in FIG. 2, may be accessed by the workstation 908 via the network management system 910 during execution of the topology generation process.

Finally, a database 914 is connected to the network management system 912, either directly and/or through the network 902. The database 914 is provided for storing, among other things, various information, including the network 902 topology information that is automatically generated by the process described herein. The network 902 topology information generated by the process can be copied from the database 914 to the directory service 910. In turn, the directory service 910 can populate the DCs (not shown) in the network 902 with the topology information, for replication or other purposes.

Although the workstation 908, directory service 910, network management system 912, and database 914 are depicted and described as being connected to the network 902, they could also be considered as part of the network 902, and are shown separately for clarity and instructional purposes. In addition, the configuration of the operating environment 900 is presented for exemplary purposes, hence the techniques for automatically generating network topology purposes, as described herein, can be implemented in other environments with other configurations.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while certain descriptions herein have referred to the format of commands in configuration files of Cisco brand routers, the invention is not limited to use with Cisco equipment. In alternative approaches, the methods described herein are applied to any other kind of equipment with appropriate modifications of parsing logic to take into account differences in configuration file format, command syntax, etc. Additionally, equivalent configuration information utilized in the process described may be obtained from a source other than a router configuration file.

Further, certain descriptions herein have assumed that particular routing protocols are in use in the network that is served by the directory server and in which the routers participate. However, the invention is not limited to any specific routing protocol. Alternative routing protocols such as RIP, EIGRP, OSPF, ISS, etc., may be used. Such routing protocols may have different kinds of summary statements, etc., that may be processed using the methods herein with appropriate modifications in parsing logic to take into account protocol differences.

What is claimed is:

1. A computer-implemented method for automatically generating network site and site link information from a router configuration file for use in a directory service comprising:

reading preprocessing information, the preprocessing information including override information for nullifying information associated with one or more sites or one or more site links from one or more router configuration files; and reading router interface information from a router configuration file associated with each of one or more routers, wherein one or more site references is generated by identifying a sub-network on a Local Area Network (LAN) interface and one or more site link references is generated by identifying a Wide Area Network (WAN) interface and wherein the override information is applied to the site and site link references wherein the step of reading preprocessing information comprises;
  reading a list of one or more site names from a data storage associated with a network management system;
  reading from the data storage a list of one or more preprocessing site links and associated site link costs;
  comparing one or more site names parsed from the one or more preprocessing site links to the list of one or more site names from the data storage and discarding one or more preprocessing site links upon failure to match;

reading from the data storage a list of one or more preprocessing address blocks and at least one from a set consisting of a preprocessing site name associated with the one or more preprocessing address blocks or a command to ignore the one or more preprocessing address blocks;

comparing the preprocessing site name associated with the one or more preprocessing address blocks to the list of one or more site names from the data storage and discarding one or more preprocessing address blocks upon a failure to match;

reading a list of one or more domain controllers from the data storage and associating the one or more domain controllers to an Internet Protocol address and to a site name obtained from a network management system;

determining a domain associated with the one or more domain controllers;

comparing the Internet Protocol address for each of the listed domain controllers to the list of one or more preprocessing address blocks;

whereupon the step of reading preprocessing information aborts if the Internet Protocol address is within one or more preprocessing address blocks and the preprocessing site name associated with the one or more preprocessing address blocks is not the same as the site name obtained from the network management system that is associated with the one or more domain controllers; and whereupon the step of reading preprocessing information continues excluding the one or more domain controllers from further processing if the Internet Protocol address is within one or more preprocessing address blocks associated with the command to ignore the one or more preprocessing address blocks.

2. The method of claim 1, further comprising steps of:
comparing an address of each of the one or more site references, one or more site link references, and one or more sub-network references to the one or more preprocessing address blocks;

deleting from processing the one or more site references, the one or more site link references, and the one or more sub-network references having an address being a subset or superset of the one or more preprocessing address blocks and deleting from processing the partial site link associated with discontinued one or more site link references; and if the temporary site name contains no site references, deleting from processing the temporary site name and associated one or more router names, partial site links, site link references, and sub-network references.

3. The method of claim 1, further comprising steps of:
merging one or more temporary site names and associated partial site links, site links, sub-network references, and router names into one or more newly created complete site names; and deleting from processing the one or more temporary site names merged into the one or more newly created complete site names, thereby reducing the quantity of temporary site names and increasing the quantity of site references associated with one or more temporary site names.

4. The method of claim 1, further comprising steps of:
processing the one or more sub-network references to ensure that sub-network references are not duplicated;
processing the one or more sub-network references to ensure that the network site information is minimized; and
merging the one or more sub-network references associated with one or more temporary site names into the one or more site references associated with the same one or more temporary site names.

5. The method of claim 1, further comprising a step of:
generating a site link between one or more temporary site names, comprising the steps of
  processing each partial site link associated with each of the one or more temporary site names to generate a valid site link based on matching a first partial site link associated with a first temporary site name with only a second partial site link associated with a second temporary site name,
  reading a list of one or more site links to determine if an existing site link between the first temporary site name and the second temporary site name exists,
  upon existence of an existing site link, comparing a bandwidth of the existing site link to a bandwidth of the valid site link,
    upon the bandwidths being equal, summing the bandwidths to create a summed bandwidth and associating the summed bandwidth with the existing site link and discarding the valid site link,
    upon the bandwidths being unequal, maintaining the existing or valid full site link with a larger bandwidth and discarding the other of the existing or valid full site link,
  upon non-existence of the existing full site link, generating a valid site link between the first temporary site name and the second temporary site name, the valid site link including a first partial site link associated with the first temporary site name and a second partial site link associated with the second temporary site name,
    comparing the bandwidth of the first partial site link to the bandwidth of the second partial site link, and
    upon the bandwidths being equal, generating a first site link cost based on the equal bandwidth and associating the first site link cost with the valid site link, upon the bandwidths being unequal, generating a second site link cost based on the smaller bandwidth and associating the second site link cost with the valid site link.

6. The method of claim 1, further comprising steps of:

replacing one or more temporary site names with one or more domain controller site names generated from an association of at least one listed domain controller from the data storage and an Internet Protocol address of the domain controller; and comparing the one or more preprocessing site names to the one or more domain controller site names;

upon a comparison match, merging the one or more preprocessing address blocks associated with the one or more preprocessing site names with the one or more domain controller site names and deleting from processing the one or more preprocessing site names;

generating a single list of site names including the one or more temporary site names and the one or more domain controller site names; and ensuring that each site name is associated with another connected site name.

7. A system comprising:

a network interface that is coupled to a network for receiving one or more packet flows therefrom;

a processor;

one or more stored sequences of instructions which, when executed by the processor, cause the processor to perform the method recited in any one of claims 1–6.

* * * * *